(12) United States Patent
Gneiting et al.

(10) Patent No.: US 9,016,775 B2
(45) Date of Patent: Apr. 28, 2015

(54) LIGHTWEIGHT CONSTRUCTION ELEMENT FOR A VEHICLE BODY

(71) Applicant: Daimler AG, Stuttgart (DE)

(72) Inventors: Philipp Gneiting, Stuttgart (DE); Kamal Idrisi, Sindelfingen (DE)

(73) Assignee: Daimler AG, Stuttgart (DE)

(*) Notice: Subject to any disclaimer, the term of this patent is extended or adjusted under 35 U.S.C. 154(b) by 0 days.

(21) Appl. No.: 14/357,819

(22) PCT Filed: Nov. 6, 2012

(86) PCT No.: PCT/EP2012/004612
§ 371 (c)(1),
(2) Date: May 13, 2014

(87) PCT Pub. No.: WO2013/075789
PCT Pub. Date: May 30, 2013

(65) Prior Publication Data
US 2014/0300142 A1    Oct. 9, 2014

(30) Foreign Application Priority Data
Nov. 22, 2011 (DE) .......................... 10 2011 119 246

(51) Int. Cl.
*B62D 25/06* (2006.01)
*B62D 29/04* (2006.01)

(52) U.S. Cl.
CPC .............. *B62D 25/06* (2013.01); *B62D 29/043* (2013.01)

(58) Field of Classification Search
USPC ..................... 296/210, 193.06, 203.03, 120.1
IPC ....................................................... B62D 25/06
See application file for complete search history.

(56) References Cited

U.S. PATENT DOCUMENTS 1,289,265 A * 12/1918 Richard et al. ................. 296/116
1,694,572 A * 12/1928 Weymann ................. 296/203.01

(Continued)

FOREIGN PATENT DOCUMENTS

DE    1804687 A1    5/1969
DE    19936882 A1    2/2001

(Continued)

OTHER PUBLICATIONS

"The Mercedes-Benz bionic car Streamlined and light, like a fish in water—economical and environmentally friendly thanks to the latest diesel technology", Press Kit: The Mercedes-Benz bionic car as a concept vehicle—DaimlerChrysler Innovation Symposium in Washington, D.C., 2005, Jun. 7, 2005, XP055056424, retrieved from the internet: URL:http://media.daimler.com/Projects/c2c/channel/documents/1133372_89404605_MB_bioniccar_en.pdf?dlf=1133372_89404605_Mb_bioniccar_en.pdf (retrieved on Mar. 13, 2013.)

(Continued)

*Primary Examiner* — Pinel Romain
(74) *Attorney, Agent, or Firm* — Patent Central LLC; Stephan A. Pendorf

(57) ABSTRACT

A lightweight construction element (2) for a body of a motor vehicle (1) with a support frame (3) having four frame parts (5, 6, 7, 8), which essentially spans a square and with panelling (4) mounted on the support frame (3). The the support frame (3) is made of a fiber-reinforced plastic and has at least two intersecting braces (9, 10, 11, 12, 13, 14, 16, 17, 19, 20) that are designed according to bionic aspects and in which the intersection or intersections (15, 18) are connected and each of which join two of the frame parts (5, 6, 7, 8) perpendicular to one another with one another.

13 Claims, 1 Drawing Sheet

(56) References Cited

U.S. PATENT DOCUMENTS

Figure 1:
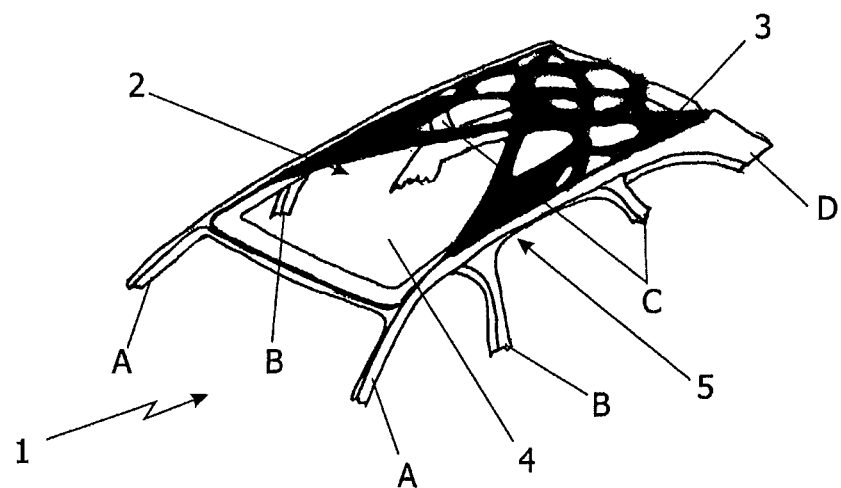

| 3,427,068 A | 2/1969 | Keahn et al. |
| 2011/0086203 A1 | 4/2011 | Gaudig et al. |

FOREIGN PATENT DOCUMENTS

| DE | 10357908 A1 | 7/2005 |
| DE | 10163822 B4 | 8/2005 |
| DE | 10359514 A1 | 8/2005 |
| DE | 102005006201 A1 | 8/2006 |
| DE | 10200750 B4 | 10/2006 |
| DE | 102009040934 A1 | 3/2011 |
| DE | 102010013784 A1 | 10/2011 |
| JP | 2001180533 A | 7/2001 |

OTHER PUBLICATIONS

International Search Report dated Mar. 20, 2014, in International Application No. PCT/EP2012/004612.

* cited by examiner

LIGHTWEIGHT CONSTRUCTION ELEMENT FOR A VEHICLE BODY

The invention relates to a lightweight construction element for a vehicle body of a motor vehicle according to the type more closely defined in the preamble of Claim 1. The invention also relates to a preferred use of such a lightweight construction element.

Components for the vehicle body of a motor vehicle are known from the general prior art. For example, they can be formed from a support frame which typically has a support frame essentially forming a square from individual frame parts. The support frame is then provided with panelling, for example sheet metal, lightweight membrane, transparent plastic, glass or the like. By way of example reference is made to the German published application DE 103 57 908 A1 or also published application DE 10 2010 013 784 A1. In the case of lightweight parts, in particular those elements and materials are used that are lighter than steel, which is ordinarily used. Light metallic alloys or fibre-reinforced plastics are conceivable. By way of example reference is made to DE 199 36 882 A1.

Regarding further prior art, reference can be made to DE 1 804 687 A. It shows a roof design for motor vehicles in which a frame element is reinforced by essentially X-shaped braces and subsequently covered with panelling. Moreover, a similar structure is known from DE 10 2005 006 201 A, wherein this roof arrangement between two regions reinforced via X has, for example, a recess for a sun roof. Regarding additional general prior art, reference should further be made to DE 63 822 B4, which shows a roof module for a motor vehicle in which the braces are configured as casings configured in a U-shape in cross section with interior bracings. Finally, a plastic material in sandwich structure is known from DE 102 00 750 B4, which has a layer as a honeycomb structure and which can be used as a transparent or translucent motor vehicle roof, in particular as panelling for said motor vehicle roof.

The problem addressed by the invention is that of creating a lightweight construction element for the vehicle body of a motor vehicle that can be built in an exceedingly light and stable manner. An inventive lightweight part that solves this problem is described by the features in the characterising part of claim 1. Additional advantageous embodiments of the lightweight construction element arise from the subsidiary claims dependent on said claim. In addition, a preferred use for such a lightweight construction element is described in claim 10.

The inventive lightweight construction element is designed such that, comparable to the lightweight construction elements in accordance with the prior art, it has a support frame with four frame parts that essentially span a square. This support frame is then furnished with panelling, for example a transparent material. In accordance with the invention, the support frame is made of a fibre-reinforced plastic and has at least two intersecting braces that are designed according to bionic aspects and connected in the intersection and which join two of the frame parts that are perpendicular to one another. The dimensioning of the individual braces as well as their connection to the frame parts takes place according to bionic aspects. This means that the transitions and the design typically run continuously and are formed by an angle bisector, a tangent function or the like. Such bionic construction aspects are known in principle from mechanical design theory. The braces designed in this way intersect in the support frame of the inventive lightweight construction element and are connected to one another in the intersection. In the process, the braces connect two of the perpendicular frame parts to one another. As a result, a high stability against bending and torsion is achieved. The fibre-reinforced plastic, for example a plastic reinforced with carbon fibres, can in the process be designed such that the force progressions or at least appreciable force components proceed in the fibre direction in the braces and the frame parts as well as in particular in the transitions and connection points. As a result a very high strength can be achieved with optimized material usage, so that the inventive lightweight construction element is lighter and yet more stable than previous elements for the vehicle body of motor vehicles.

In the process, provision is made for the frame parts and braces to be arranged in mirror symmetry to an axis of symmetry. This axis of symmetry can in the process run in the direction of travel of the vehicle. This mirror symmetric structure guarantees a high torsional stiffness and permits an increase in the torsion vibration mode.

Furthermore, one part of the support frame is designed so as to be extensively free of braces in the direction of the axis of symmetry on one side, while the opposing part in the direction of symmetry has the majority of the braces and all intersections of the braces. Such a design with braces shifted to one side of the support frame in addition allows a very high stiffness against torsion and crosswise bending with minimum losses in stiffness vis-à-vis lateral bends. However, the structure permits a very stable support frame of the lightweight construction element, to a great extent freeing up part of the enclosed space. This is a decisive advantage in particular in the use of a transparent panelling, since as a result for example large window areas can be realized in a vehicle through the inventive lightweight construction element.

The benefit of the inventive lightweight construction element therefore lies in particular in use with a transparent panelling or panelling that changes with respect to transparency and/or colour for use as a vehicle roof, since here, in particular in the last mentioned design comparatively large free areas are achieved in the case of high stiffness and low weight, said areas having only the panelling and thus for example making possible a good view upward in a vehicle provided with such a vehicle roof.

Additional advantageous designs of the inventive lightweight construction element are specified in the remaining dependent claims and arise from the following exemplary embodiment described in greater detail with the help of the figures.

Figure 2:
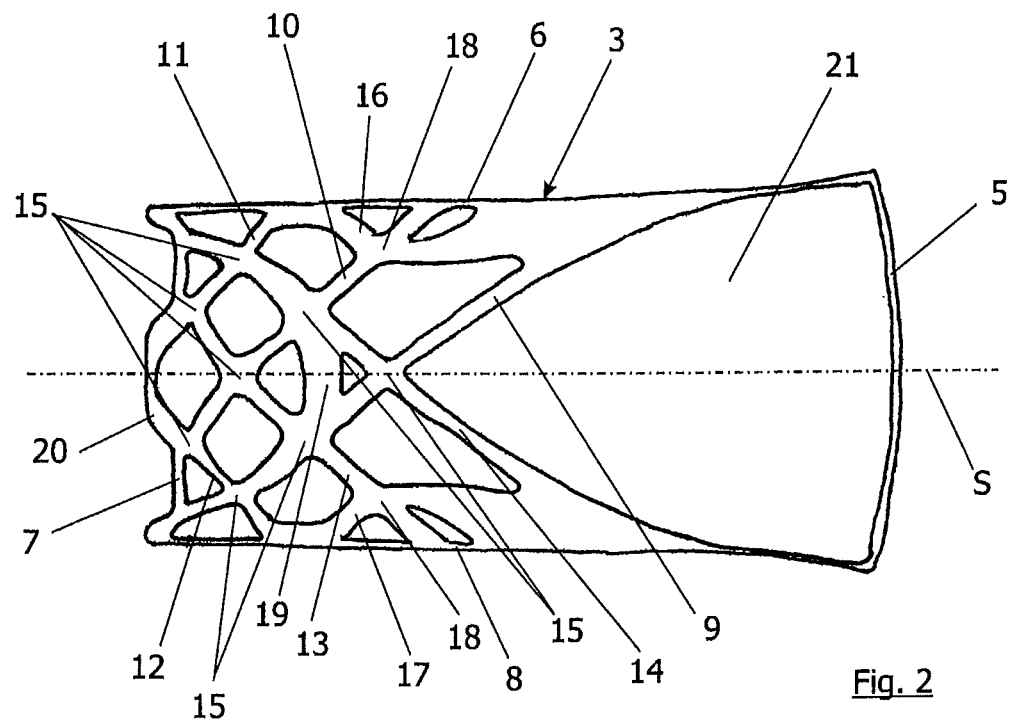

The figures show the following:

FIG. 1 a section of a vehicle body with an inventive lightweight construction element as a vehicle roof; and FIG. 2 a top view of the support frame of the inventive lightweight construction element.

In the depiction of FIG. 1, part of a motor vehicle 1 indicated in accordance with the principle can be seen. It is part of the so-called basic structure of the motor vehicle 1, in particular around its roof region. A, B, C and D are the extensions of the so-called A column, B column, C column and D column connected to the roof region. As usual, the roof region is designed to be open in the section of the basic structure shown here. In the event of designs in accordance with the prior art, it can be closed for example by a cross-member and a sheet of aluminium placed on top as panelling. In the case shown here a lightweight construction element 2 serves as the roof, said element consisting of a support frame 3 represented in black in FIG. 1 as well as a transparent panelling 4. The transparent panelling can for example be made of a plastic material, glass or also a so-called functional material such as for example a material adjustable in its transparency and/or colour by application of electric potential. As the panelling is of secondary importance for the invention presented here we will not go into greater detail about said panelling.

The support frame 3 is crucial for the lightweight construction element 1 described here. Therefore this support frame 3 is shown again in top view in the representation of FIG. 2. It is designed mirror symmetrically to the axis of symmetry S and has four frame parts 5, 6, 7 and 8. In the process the support frame 3 is preferably designed such that it is formed in the one direction, here in the direction of the axis of symmetry S with a greater dimension than in the other transverse direction. Accordingly the partial frames 6, 8 are designed to be longer than the shorter partial frames 5, 7. However, taken as a whole the four partial frames form a square or depending on the curvature of the roof they form a square in their projection. Six additional braces 9, 10, 11, 12, 13, 14 are provided to strengthen the four frame parts 5, 6, 7, 8. Three of the braces 9, 10, 11 each extend proceeding from the longer frame part 6 to the shorter frame part 7 and three further braces 12, 13, 14 extend likewise from the longer frame part 8 to the shorter frame part to the shorter frame part 7. The braces 9 to 14 intersect and are connected to one another in their intersections 15. Like frame parts 5 to 8, braces 9 to 14 are constructed in accordance with bionic criteria, so that the transitions in the material do not take place abruptly, but rather in continuous forms known from biology, for example in the form of tangent functions, of polygons constructed of angle bisectors or the like. In the region of the intersections 15, in which braces 9, 10, 11 proceeding from frame part 6 and braces 12, 13, 14 which proceed from frame part 8, intersect, they are connected to one another. In this region the individual braces 9 to 14 can have additional material supports. Preferably, fibre-reinforced plastic is used as a material, in particular carbon fibre-reinforced plastic. Thus very small maximum wall thicknesses of typically less than 5 mm can be implemented. In the region of the braces 9 to 14 and of intersections 15, the fibre direction can be guided so that it corresponds to the flow of forces to be expected and hence with minimum material usage the maximum strength of the support frame 3 can be achieved.

In addition to this on the two longer frame parts 6, 8, bent braces 16, 17 extend from the respective frame part 6, 8 proceeding in the direction of the axis of symmetry and after intersecting one of the braces 9, 10, 13 in intersections 18, return to the respective frame part 6, 8. A similarly structured bent brace with reference numeral 19 is arranged on the side of the shorter frame part 7. The bent brace 19 in the process coincides partially with the braces 9, 14 in their course and intersects the other braces 10, 11, 12 and 13. These intersections 18 can also be reinforced preferably by additional fibre-reinforced plastic. An additional bent brace with reference numeral 20 protrudes from frame part 7, which is open here; in the other direction than that of the described bent brace 19.

On the whole the structure is designed mirror symmetrically to the axis of symmetry S. In the representation of FIG. 2 on the left it makes a comparatively large free area 21 possible for the end facing the short frame part 5. As can be seen from the representation of FIG. 1, this comparatively large free area 21 is arranged above the region between the A column and the B column and partially above the region between the B column and the C column. In particular with the transparent or at least partially transparent panelling 4 that has already been mentioned the lightweight construction element 2 makes a very large window opening possible in the roof of the vehicle 1. The structure of the support frame 3 allows a much higher torsional stiffness and in particular an increase of the global vibration modes, in particular of the torsion mode. In addition, it achieves a much higher stiffness with respect to crosswise bending. The stiffness with respect to lateral bending declines only minimally, however, this is to be tolerated due to the high torsional stiffness and stiffness against crosswise bending and in this way makes possible, much more easily than in the case of a conventional roof structure, a very stable and with respect to the comfort and possibility of introducing a large window opening, a very advantageous roof of the vehicle 1. In addition, the structure of the lightweight construction element 2 optimized through bionic construction considerations is very elegant and can be used as a design element, in particular in the case of use with transparent panelling.

The invention claimed is:

1. A lightweight construction element (2) for a body of a motor vehicle (1) with a support frame (3) having four frame parts (5, 6, 7, 8), which essentially spans a square, and with panelling (4) mounted on the support frame (3), wherein the support frame (3) is made of a fibre-reinforced plastic and has at least two intersecting braces (9, 10, 11, 12, 13, 14, 16, 17, 19, 20) that are designed according to bionic aspects are connected in the intersection or intersections (15, 18), and which connect two of the frame parts perpendicular to one another (5, 6, 7, 8) to one another, wherein the frame parts (5, 6, 7, 8) and the braces (9, 10, 11, 12, 13, 14, 16, 17, 19, 20) are arranged mirror symmetrically to an axis of symmetry (S), and wherein the one part (21) of the support frame (3) in the direction of the axis of symmetry (S) is designed on the one side predominantly free of braces (9, 10, 11, 12, 13, 14, 16, 17, 19, 20), while the part opposite the direction of the axis of symmetry (S) has the majority of the braces (9, 10, 11, 12, 13, 14, 16, 17, 19, 20) and all intersections (15, 18) of the braces (9, 10, 11, 12, 13, 14, 16, 17, 19, 20).

2. The lightweight construction element (2) according to claim 1, wherein the axis of symmetry (S) runs in the direction of travel of the vehicle (1).

3. The lightweight construction element (2) according to claim 1, wherein the support frame (3) is designed in the direction of the axis of symmetry (S) longer than perpendicular to the axis of symmetry (S).

4. The lightweight construction element (2) according to claim 3, wherein three braces (9, 10, 11, 12, 13, 14) run from each of the longer frame parts (6, 8) to a common one of the shorter frame parts (7) each of which intersecting with at least two other braces (9, 10, 11, 12, 13, 14).

5. A lightweight construction element (2) for a body of a motor vehicle (1) with a support frame (3) having four frame parts (5, 6, 7, 8), which essentially spans a square, and with panelling (4) mounted on the support frame (3),
  wherein the support frame (3) is made of a fibre-reinforced plastic and has at least two intersecting braces (9, 10, 11, 12, 13, 14, 16, 17, 19, 20) designed according to bionic aspects connected in the intersection or intersections (15, 18), and which connect two of the frame parts perpendicular to one another (5, 6, 7, 8) to one another,
  wherein the frame parts (5, 6, 7, 8) and the braces (9, 10, 11, 12, 13, 14, 16, 17, 19, 20) are arranged mirror symmetrically to an axis of symmetry (S),
  wherein the one part (21) of the support frame (3) in the direction of the axis of symmetry (S) is designed on the one side predominantly free of braces (9, 10, 11, 12, 13, 14, 16, 17, 19, 20), while the part opposite the direction of the axis of symmetry (S) has the majority of the braces (9, 10, 11, 12, 13, 14, 16, 17, 19, 20) and all intersections (15, 18) of the braces (9, 10, 11, 12, 13, 14, 16, 17, 19, 20), and wherein bent braces (16, 17, 19, 20) are present between the braces (9, 10, 11, 12, 13, 14) running from the longer frame part (6, 8) and at least one of the shorter frame parts (7) in an arc back to the same frame part (6, 7, 8).

6. The lightweight construction element (2) according to claim 1, wherein the intersections (15, 18) are designed reinforced with additional fibre-reinforced plastic.

7. The lightweight construction element (2) according to claim 1, wherein the panelling (4) is designed to be transparent or subject to change in its transparency and/or colour.

8. A vehicle roof comprising of the lightweight construction element (2) according to claim 1.

9. The lightweight construction element (2) according to claim 5, wherein the axis of symmetry (S) runs in the direction of travel of the vehicle (1).

10. The lightweight construction element (2) according to claim 5, wherein the support frame (3) is designed in the direction of the axis of symmetry (S) longer than perpendicular to the axis of symmetry (S).

11. The lightweight construction element (2) according to claim 10, wherein three braces (9, 10, 11, 12, 13, 14) run from each of the longer frame parts (6, 8) to a common one of the shorter frame parts (7) each of which intersecting with at least two other braces (9, 10, 11, 12, 13, 14).

12. The lightweight construction element (2) according to claim 5, wherein the intersections (15, 18) are designed reinforced with additional fibre-reinforced plastic.

13. The lightweight construction element (2) according to claim 5, wherein the panelling (4) is designed to be transparent or subject to change in its transparency and/or colour.

* * * * *